(12) United States Patent
Cho et al.

(10) Patent No.: US 11,988,160 B2
(45) Date of Patent: May 21, 2024

(54) VALVE CONTROL APPARATUS FOR ENGINE

(71) Applicant: HD HYUNDAI INFRACORE CO., LTD., Incheon (KR)

(72) Inventors: Jayun Cho, Incheon (KR); Youngdeok Han, Incheon (KR); Dockoon Yoo, Incheon (KR); Dongmyung Kang, Incheon (KR); Wook Jung, Incheon (KR); Jungho Kim, Incheon (KR); Jongwook Byun, Incheon (KR); Younghoon Lee, Incheon (KR); Taesub Kim, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 182 days.

(21) Appl. No.: 17/416,007

(22) PCT Filed: Dec. 9, 2019

(86) PCT No.: PCT/KR2019/017291
§ 371 (c)(1),
(2) Date: Mar. 2, 2022

(87) PCT Pub. No.: WO2020/130446
PCT Pub. Date: Jun. 25, 2020

(65) Prior Publication Data
US 2022/0220906 A1    Jul. 14, 2022

(30) Foreign Application Priority Data
Dec. 18, 2018  (KR) .......................... 10-2018-0163990

(51) Int. Cl.
*F02D 13/02*    (2006.01)
*F01L 1/08*    (2006.01)

(52) U.S. Cl.
CPC ............ *F02D 13/0207* (2013.01); *F01L 1/08* (2013.01)

(58) Field of Classification Search
CPC ... F01L 1/08; F01L 1/053; F01L 1/047; F01L 2001/0535; F01L 2001/0537;
(Continued)

(56) References Cited

U.S. PATENT DOCUMENTS 4,327,676 A * 5/1982 McIntire .................. F02B 1/12
123/90.6
6,321,731 B1   11/2001 Russ et al.
(Continued)

FOREIGN PATENT DOCUMENTS

CN          1774568 A        5/2006
DE   10 2006 041 231 A1     3/2008
(Continued)

OTHER PUBLICATIONS

Office Action dated Sep. 2, 2022, for corresponding Korean Patent Application No. 10-2021-7018721 (4 pages).
(Continued)

*Primary Examiner* — Kenneth J Hansen
*Assistant Examiner* — Kelsey L Stanek
(74) *Attorney, Agent, or Firm* — Hauptman Ham, LLP

(57) ABSTRACT

Provided is a valve control apparatus for an engine that opens and closes an exhaust valve and intake value of the engine while rotating in conjunction with a crankshaft of the engine, the valve control apparatus including an exhaust valve opening and closing device opening and closing the exhaust valve during a first exhaust valve opening period and an intake valve opening and closing device opening and closing the intake valve during a first intake valve opening period.

6 Claims, 13 Drawing Sheets

(58) Field of Classification Search
CPC ............... F01L 2250/02; F01L 2800/10; F01L 2820/01; F01L 13/0015; F02D 13/0207; F02D 13/0273; F02D 13/0203; F02D 41/006; Y02T 10/12
USPC ........................................................ 123/90.6
See application file for complete search history.

(56) References Cited

U.S. PATENT DOCUMENTS

| | | | |
|---|---|---|---|
| 9,726,089 B2 | 8/2017 | Kemmerling et al. | |
| 2004/0118367 A1* | 6/2004 | Ezaki ..................... | F01L 1/042 123/90.11 |
| 2008/0017150 A1* | 1/2008 | Tsuchida ................ | F16H 9/18 123/90.17 |
| 2009/0217893 A1* | 9/2009 | Fujita .................... | F01L 13/0036 123/90.12 |
| 2010/0121557 A1* | 5/2010 | Canino .................. | F01L 9/14 123/90.12 |
| 2015/0267624 A1 | 9/2015 | Kemmerling et al. | |
| 2017/0167325 A1 | 6/2017 | Di Nunno | |
| 2020/0095903 A1* | 3/2020 | Sueoka ................. | F02D 13/0226 |

FOREIGN PATENT DOCUMENTS

| | | |
|---|---|---|
| DE | 10 2009 034 763 A1 | 2/2010 |
| EP | 1 273 770 A2 | 1/2003 |
| EP | 3 008 300 B1 | 3/2017 |
| FR | 3 044 359 A1 | 6/2017 |
| JP | 2001-107759 A | 4/2001 |
| JP | 2003-74386 A | 3/2003 |
| JP | 2003-269181 A | 9/2003 |
| JP | 2003269181 A * | 9/2003 |
| JP | 2008-157155 A | 7/2008 |
| JP | 2010-112371 A | 5/2010 |
| JP | 2012-021440 A | 2/2012 |
| JP | 2012021440 A * | 2/2012 |
| KR | 10-1998-0037370 A | 8/1998 |
| KR | 1019980037370 A * | 8/1998 |

OTHER PUBLICATIONS

Office Action dated Nov. 3, 2022, for corresponding Chinese Patent Application No. 201980083842.9 (8 pages).
Extended European Search Report dated Aug. 25, 2022, for corresponding European Patent Application No. 19900746.9 (7 pages).
International Search Report dated Mar. 24, 2020, corresponding to International Application No. PCT/KR2019/017291.

* cited by examiner

<P1>

<P2>

<P4>

VALVE CONTROL APPARATUS FOR ENGINE

CROSS-REFERENCE TO RELATED APPLICATION

This present application is a national stage filing under 35 U.S.C § 371 of PCT application number PCT/KR2019/017291 filed on Dec. 9, 2019, which is based upon and claims the benefit of priority to Korean Patent Application No. 10-2018-0163990 filed Dec. 18, 2018 in the Korean Intellectual Property Office. The disclosures of the above-listed applications are hereby incorporated by reference herein in their entireties.

BACKGROUND OF THE DISCLOSURE

Field of the Disclosure

The present disclosure relates to a valve control apparatus for controlling opening and closing of an exhaust valve and an intake valve of an engine.

Related Art

In general, a valve control apparatus for an engine includes a camshaft in which cams for opening and closing an exhaust valve and an intake valve of each cylinder are coupled to one shaft.

To describe a four-stroke engine as an example, the engine cycle consists of four piston strokes: intake, compression, explosion, and exhaust. That is, one cycle is completed by two rotations of the crankshaft. In addition, an intake valve and an exhaust valve for each cylinder are mounted on a cylinder head of the engine, and the opening and closing of the intake valve and the exhaust valve is performed by rotation of a camshaft that rotates in conjunction with the crankshaft. At this time, the camshaft rotates by being connected to the crankshaft with the timing chain or the like, and the camshaft rotates once while the crankshaft rotates two times.

Therefore, the crankshaft and the camshaft rotate according to the four-stroke cycle operation of each cylinder, and the intake valve and the exhaust valve are opened and closed with the rotation of the camshaft, enabling continuous operation of the engine.

Here, a typical camshaft is designed to open the intake valve and the exhaust valve one by one. The intake valve is designed to increase the volumetric efficiency by allowing fresh air to enter the cylinder well and, and the exhaust valve is designed to allow exhaust gas to escape well.

Meanwhile, various new technologies are being applied to diesel engines to satisfy the enhancing environmental regulations, and an exhaust gas recirculation (EGR) system and a selective catalytic reduction (SCR) system are mainly used as a method for reducing nitrogen oxides in the exhaust gas.

However, when the exhaust gas recirculation system and the selective catalytic reduction system are applied to the engine to reduce the nitrogen oxides in the exhaust gas, there is a limitation that the cost of manufacturing the engine is greatly increased and the structure of the engine is quite complicated.

SUMMARY

Embodiments of the present disclosure provide a valve control apparatus for an engine capable of improving engine torque, improving fuel economy of the engine, lowering the temperature of engine exhaust gas, and reducing nitrogen oxide emissions, by increasing the volumetric efficiency of an engine cylinder.

In an aspect, there is provided a valve control apparatus for an engine that opens and closes an exhaust valve and an intake valve of the engine in conjunction with a crankshaft of the engine. The valve control apparatus for the engine includes an exhaust valve opening and closing device opening and closing the exhaust valve during a first exhaust valve opening period, and an intake valve opening and closing device opening and closing the intake valve during a first intake valve opening period. In addition, the exhaust valve opening and closing device is configured to further open and close the exhaust valve during a second exhaust valve opening period relatively shorter than the first exhaust valve opening period within the first intake valve opening period, and the intake valve opening and closing device is configured to further open and close the intake valve during a second intake valve opening stage relatively shorter than the first intake valve opening period within the first exhaust valve opening period.

The valve control apparatus for an engine may further include a camshaft connected to the crankshaft and driven to rotate, the exhaust valve opening and closing device may include an exhaust cam provided on the camshaft, and the intake valve opening and closing device may include an intake cam provided on the camshaft. The exhaust cam may include a first exhaust cam nose for opening and closing the exhaust valve during the first exhaust valve opening period and a second exhaust cam nose for opening and closing the exhaust valve during the second exhaust valve opening period, the intake cam may include a first intake cam nose for opening and closing the intake valve during the first intake valve opening period and a second intake cam nose for opening and closing the intake valve during the second exhaust valve opening period, and the second exhaust cam nose and the second intake cam nose may be formed to have a size relatively smaller than the first exhaust cam nose and the first intake cam nose, respectively.

A profile of the exhaust cam may be formed so that a ratio of the second exhaust valve opening period by the second exhaust cam nose of the exhaust cam to the first exhaust valve opening period by the first exhaust cam nose of the exhaust cam is falls within a range of 0.32 to 0.36.

A profile of the exhaust cam may be formed so that a ratio of the second intake valve opening period by the second intake cam nose of the intake cam to the first intake valve opening period by the first intake cam nose of the intake cam is falls within a range of 0.34 to 0.38.

A piston reciprocating within a cylinder of the engine may be located at a top dead center when a crankshaft rotation angle is 0 degrees, 360 degrees, and 720 degrees, and be located at a bottom dead center when the crankshaft rotation angle is 180 degrees and 540 degrees, and a maximum opening point of the exhaust valve in the second exhaust valve opening period may fall within a range of 487 degrees to 507 degrees based on the crankshaft rotation angle.

The first intake valve opening period may fall within a range of 310 degrees to 590 degrees based on the crankshaft rotation angle.

A piston reciprocating within a cylinder of the engine may be located at a top dead center when a crankshaft rotation angle is 0 degrees, 360 degrees, and 720 degrees, and be located at a bottom dead center when the crankshaft rotation angle is 180 degrees and 540 degrees, and a maximum opening point of the intake valve in the second intake valve opening period may fall within a range of 216 degrees to 236 degrees based on the crankshaft rotation angle.

The first exhaust valve opening period may fall within a range of 120 degrees to 390 degrees based on the crankshaft rotation angle.

A maximum lift of the exhaust valve in the second exhaust valve opening period and a maximum lift of the intake valve in the second intake valve opening period may be 0.8 mm or more.

According to embodiments of the present disclosure, a valve control apparatus for an engine can improve engine torque, improve fuel economy of the engine, lower the temperature of engine exhaust gas, and reduce nitrogen oxide emissions, by increasing the volumetric efficiency of an engine cylinder.

DESCRIPTION OF EXEMPLARY EMBODIMENTS

Figure 1:
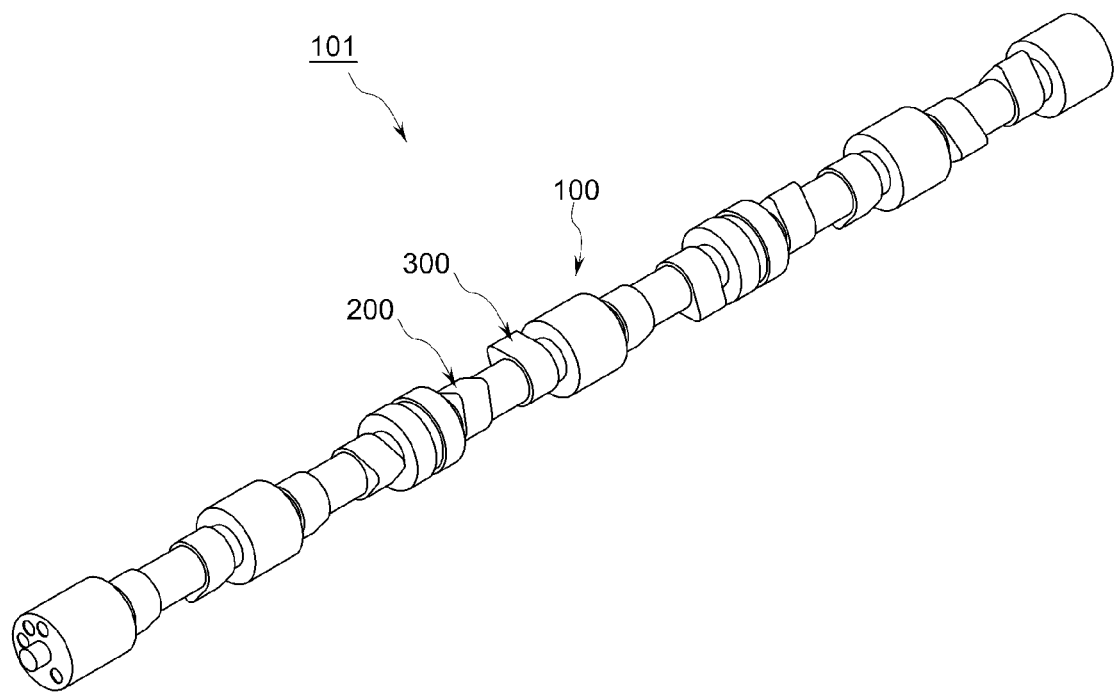
FIG. 1 is a perspective view of a valve control apparatus for an engine according to an embodiment of the present disclosure.

Hereinafter, embodiments of the present disclosure will be described in detail with reference to the accompanying drawings so that those of ordinary skill in the art may easily implement the present disclosure. The present disclosure may be implemented in various different forms and is not limited to the embodiments described herein.

It is to be noted that drawings are schematic and are not drawn to scale. Relative dimensions and ratios of parts in the drawings are exaggerated or reduced in size for clarity and convenience in the drawings, and any dimensions are merely exemplary and not limiting. In addition, the same reference numerals are used to indicate similar features to the same structure, element, or part appearing in two or more drawings.

Embodiments of the present disclosure specifically represent ideal embodiments of the present disclosure. As a result, various variations of the illustration are expected. Accordingly, embodiments are not limited to a specific shape in the illustrated area, and includes, for example, a modification of the shape by manufacturing.

Hereinafter, a valve control apparatus 101 for an engine according to an embodiment of the present disclosure will be described with reference to FIGS. 1 to 13. The valve control apparatus 101 may control opening and closing of an intake valve 710 and an exhaust valve 720 of the engine. Here, the engine may be a four-stroke diesel engine, and may include a crankshaft. The crankshaft is a device that converts the reciprocating motion of a piston 400 into rotational motion. Since the crankshaft is widely known to those skilled in the art, detailed descriptions of the crankshaft will be omitted.

Specifically, in the four-stroke engine, one cycle is completed with four piston strokes: intake, compression, explosion, and exhaust. That is, the piston 400 descends in the intake stroke, the piston 400 rises in the compression stroke, the piston 400 descends in the combustion stroke, and the piston 400 rises in the exhaust stroke. In this way, since the piston 400 reciprocates twice in one cycle, the crankshaft rotates twice. The intake valve 710 and the exhaust valve 720 are mounted on the cylinder head of the engine for each cylinder 500. The valve control apparatus 101 is for opening and closing the intake valve 710 and the exhaust valve 720 every one cycle, and the valve control apparatus 101 may include an intake valve opening and closing device for opening and closing the intake valve 710 and an exhaust valve opening and closing device for opening and closing the exhaust valve 720. The intake valve opening and closing device and the exhaust valve opening and closing device may be configured in a mechanical or electronic manner. According to an exemplary embodiment, the electronic intake valve opening and closing device and the exhaust valve opening and closing device may be configured to be connected to the intake valve 710 and the exhaust valve 720, respectively, to be driven by electromagnetic force, or to open and close the intake valve 710 and the exhaust valve 720 by driving a camshaft 100 to be described later with an electric device, such as an electric motor. Meanwhile, the mechanical intake valve opening and closing device and the exhaust valve opening and closing device may include a camshaft 100 for opening and closing the intake valve 710 and the exhaust valve 720 by rotating in conjunction with the crankshaft of the engine. The camshaft 100 may be provided to open and close the intake valve 710 and the exhaust valve 720 by one rotation per cycle, and connected to the crankshaft through a power transmission means such as a timing chain so as to rotate once as the crankshaft rotates twice. In addition, as the camshaft 100, one camshaft 100 having a plurality of cams controls the intake valves 710 and the exhaust valves 720, or a plurality of cams are installed in a distributed manner on a plurality of camshafts 100, so that the plurality of camshafts 100 may share the control of the opening and closing of the intake valves 710 and the exhaust valves 720. The electronic valve control apparatus and the mechanical valve control apparatus described above may control an opening and closing timing, period, and valve lift of the intake valve 710 and the exhaust valve 720 in the same degree. Hereinafter, for convenience of understanding, a mechanical valve control apparatus using one camshaft 100, which can be referred to as a universal structure, will be described as an example.

As shown in FIG. 1, the camshaft 100 of the valve control apparatus 101 for the engine according to an embodiment of the present disclosure includes an intake cam 200 and an exhaust cam 300. The intake cam 200 opens and closes the intake valve 710 while rotating, and the exhaust cam 300 opens and closes the exhaust valve 720 while rotating.

Figure 2:
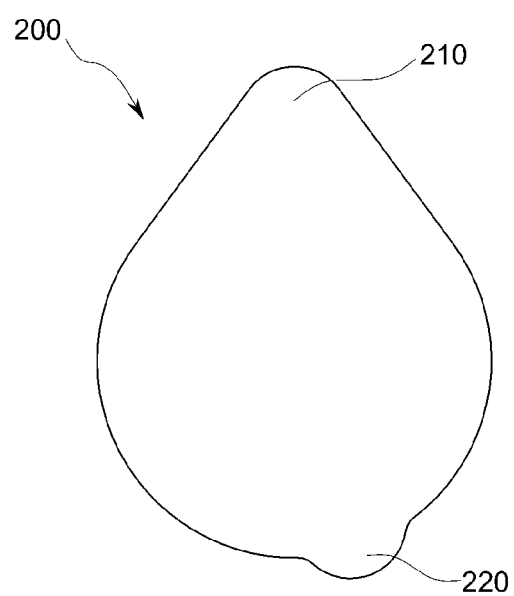
FIG. 2 is a view illustrating a profile of an intake cam of FIG. 1.

Specifically, as shown in FIG. 2, the intake cam 200 may include a first intake cam nose 210 and a second intake cam nose 220. The second intake cam nose 220 is formed to have a size relatively smaller than that of the first intake cam nose 210. In addition, the second intake cam nose 220 is formed on the opposite side of the first intake cam nose 210, but the second intake cam nose 220 and the first intake cam nose 210 are not necessarily formed at an angle of 180 degrees.

The first intake cam nose 210 of the intake cam 200 opens and closes the intake valve 710 during the first intake valve opening period, and the second intake cam nose 220 of the intake cam 200 additionally open and close the intake valve 710 during the second intake valve opening period. At this time, the second intake valve opening period is relatively shorter than the first intake valve opening period. In addition, the second intake valve opening period falls within the first exhaust valve opening period to be described later. That is, the intake valve 710 is opened and closed by the second intake cam nose 220 during the time when the exhaust valve 720 is opened by the first exhaust cam nose 310.

Figure 3:
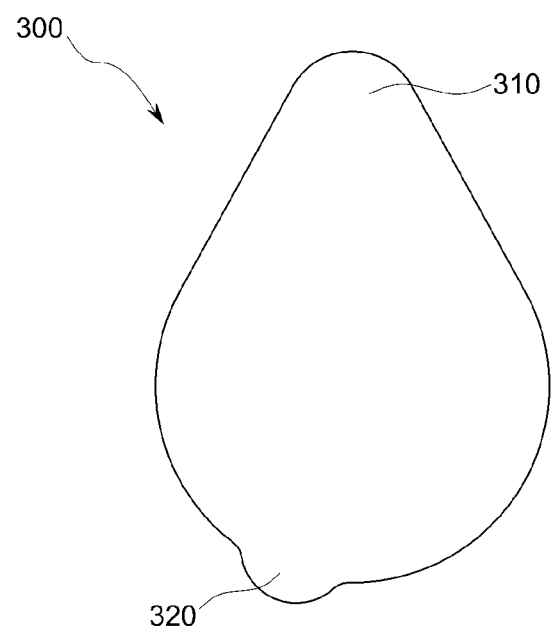
FIG. 3 is a view illustrating a profile of an exhaust cam of FIG. 1.

The exhaust cam 300 may include a first exhaust cam nose 310 and a second exhaust cam nose 320, as shown in FIG. 3. The second exhaust cam nose 320 is formed to have a relatively smaller size than that of the first exhaust cam nose 310. In addition, the second exhaust cam nose 320 is formed on the opposite side of the first exhaust cam nose 310, but the second exhaust cam nose 320 and the first exhaust cam nose 310 are not necessarily formed at an angle of 180 degrees.

The first exhaust cam nose 310 of the exhaust cam 300 opens and closes the exhaust valve 720 during the first exhaust valve opening period, and the second exhaust cam nose 320 of the exhaust cam 300 additionally open and close the exhaust valve 720 during the second exhaust valve opening period. At this time, the second exhaust valve opening period is relatively shorter than the first exhaust valve opening period. In addition, the second exhaust valve opening period falls within the first intake valve opening period described above. That is, the exhaust valve 720 is opened and closed by the second exhaust cam nose 320 during the time when the intake valve 710 is opened by the first intake cam nose 210.

The intake valve 710 may be opened in advance by a preset crank rotation angle before the exhaust valve 720 is closed. The section in which the intake valve 710 and the exhaust valve 720 are simultaneously opened in this way is referred to as an overlap section, and in the present embodiment, the overlap section is formed within the range of 35 degrees to 40 degrees based on the crank rotation angle, and the angle between the point at which the intake valve 710 starts to open and the top dead center of the piston is formed larger than the angle between the point at which the exhaust valve 720 is closed and the top dead center of the piston. Here, the piston top dead center is 360 degrees based on the crank rotation angle. For example, the time point at which the intake valve 710 starts to open for the above-described overlap may be set to be faster than the piston top dead center within the range of 24 degrees to 28 degrees based on the crank rotation angle, and the point at which the exhaust valve 720 is completely closed may be set to be later than the piston top dead center within a range of 10 degrees to 16 degrees based on the crank rotation angle. Accordingly, the intake valve 710 and the exhaust valve 730 may be simultaneously opened in a total of three sections, including simultaneous opening sections in two sections to be described later.

Hereinafter, an operating process and effects of the camshaft 100 of the valve control apparatus 101 for the engine according to an embodiment of the present disclosure will be exemplarily described with reference to FIGS. 4 to 8.

Figure 4:
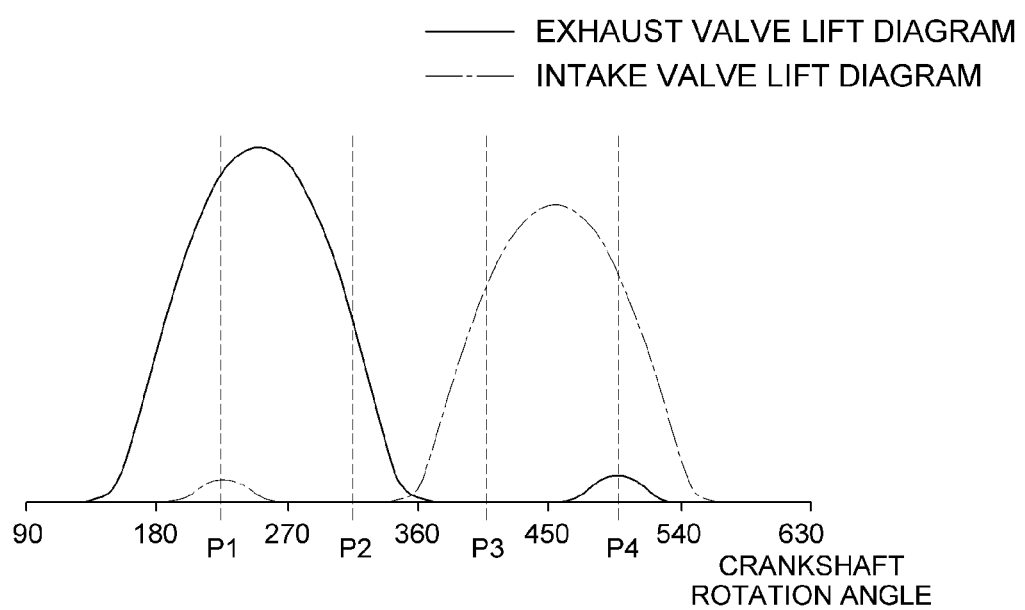
FIG. 4 shows lift diagrams of an intake valve and an exhaust valve operated by the valve control apparatus for the engine of FIG. 1.

FIG. 4 is a graph showing a timing and degree of opening and closing of the intake valve 710 and the exhaust valve 720 by rotation of the camshaft 100 of the valve control apparatus 101 for the engine. FIGS. 5 to 8 show opening and closing states of the intake valve 710 and the exhaust valve 720 at points P1, P2, P3, and P4 of FIG. 4, respectively.

However, in FIGS. 5 to 8, the connection structure between the camshaft 100 of the valve control apparatus 101 for the engine and the intake valve 710 and the exhaust valve 720 is not shown in detail, but it is known to those skilled in the art in a variety of ways. For example, the intake cam 200 and the exhaust cam 300 may directly contact the intake valve 710 and the exhaust valve 720, respectively, to open and close them. In addition, the intake cam 200 and the exhaust cam 300 may open and close the intake valve 710 and the exhaust valve 720 through mechanisms such as a push rod, a tappet, and a rocker arm. Specifically, the engine may be classified into a side valve (SV) type, an over-head valve (OHV) type, an over-head camshaft (OCC) type, a dual over-head camshaft (DOHC) type, and the like, based on the position of the valve or the camshaft 100 of the valve control apparatus 101 for the engine. In addition, as described above, the valve control apparatus may open and close the valves by using an electronic control method.

First, when the exhaust stroke starts while the piston 400 rises, the camshaft 100 of the valve control apparatus 101 for the engine in conjunction with the crankshaft rotates and the first exhaust cam nose 310 of the exhaust cam 300 opens the exhaust valve 720. Here, the exhaust valve 720 opened by the first exhaust cam nose 310 is opened during the first exhaust valve opening period.

Figure 5:
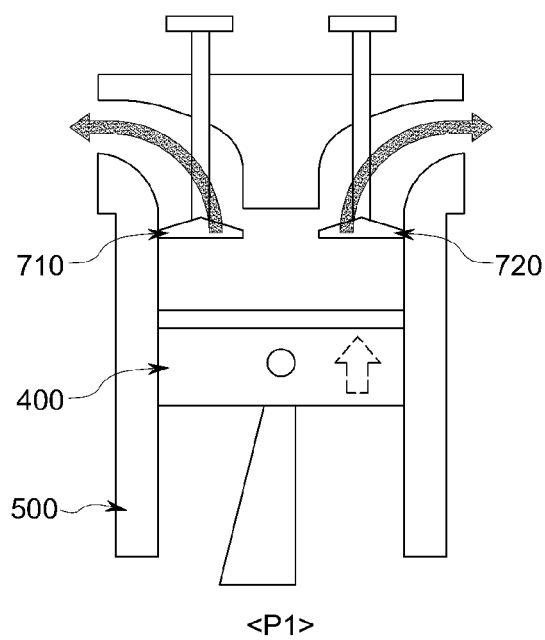
FIG. 5 shows operating states of the intake valve and the exhaust valve at point P1 of FIG. 4.

Next, at point P1 of FIG. 4, as shown in FIG. 5, the intake valve 710 is opened by the second intake cam nose 220 of the intake cam 200 within the first exhaust valve opening period. In this way, when the intake valve 710 is opened during the exhaust stroke, some of the exhaust gas in a combustion chamber of the cylinder 500 is discharged through the intake valve 710, and the exhaust gas discharged through the intake valve 710 is introduced into the combustion chamber of the cylinder 500 again together with new air in the subsequent intake stroke. In this way, when some of the exhaust gas is discharged through the intake valve 710 in the exhaust stroke and then introduced back into the cylinder 500 in the intake stroke, an effect similar to the exhaust gas recirculation (EGR) system in the related art can be obtained.

Figure 6:
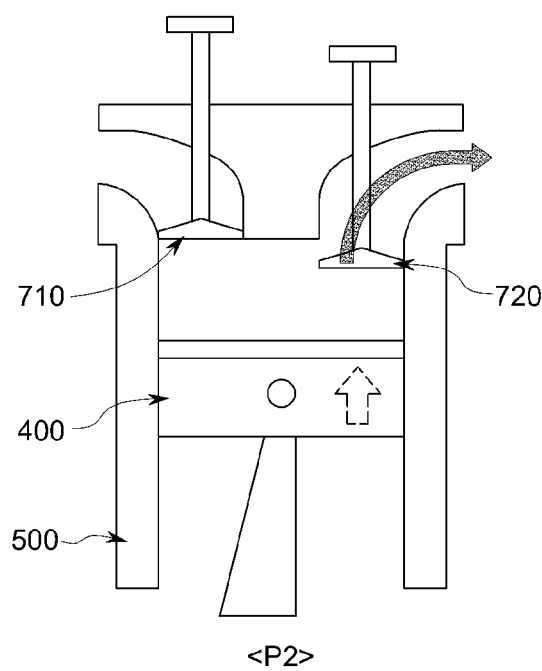
FIG. 6 shows operating states of the intake valve and the exhaust valve at point P2 of FIG. 4.

Then, at point P2 in FIG. 4, as shown in FIG. 6, the intake valve 710 is first closed, and the exhaust gas is discharged through the exhaust valve 720 to complete the exhaust stroke.

Figure 7:
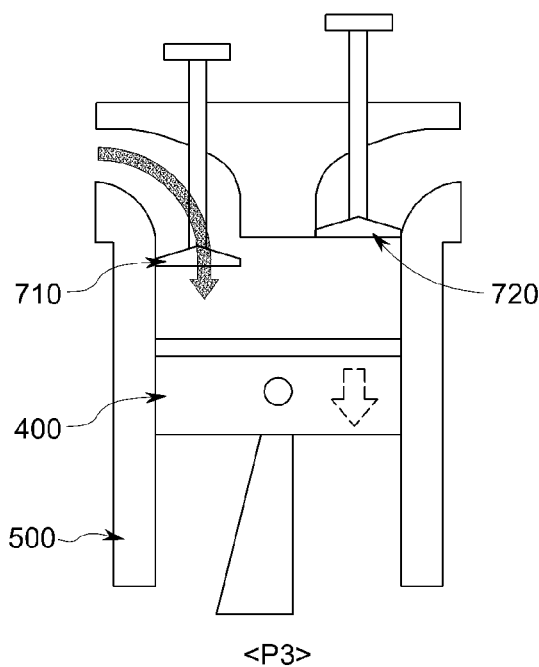
FIG. 7 shows operating states of the intake valve and the exhaust valve at point P3 of FIG. 4.

Next, at point P3 of FIG. 4, as shown in FIG. 7, when the intake stroke starts while the piston 400 descends, the camshaft 100 of the valve control apparatus 101 for the engine in conjunction with the crankshaft rotates and the first intake cam nose 210 of the intake cam 200 opens the intake valve 710. Here, the intake valve 710 opened by the first intake cam nose 210 is opened during the first intake valve opening period. In this way, when the intake valve 710 is opened, the exhaust gas discharged through the intake valve 710 in the exhaust stroke is introduced into the combustion chamber of the cylinder together with fresh air.

Figure 8:
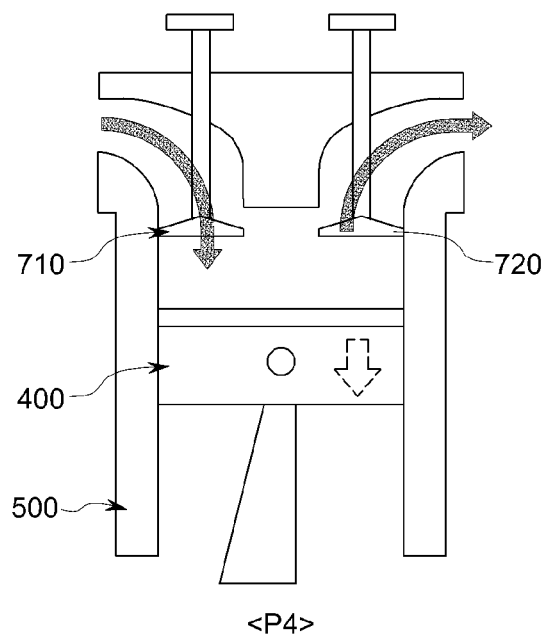
FIG. 8 shows operating states of the intake valve and the exhaust valve at point P4 of FIG. 4.

Next, at point P4 of FIG. 4, as shown in FIG. 8, the exhaust valve 720 is opened by the second exhaust cam nose 320 of the exhaust cam 300 within the first intake valve opening period. Then, some of the new air introduced into the combustion chamber of the cylinder 500 through the intake valve 710 is immediately discharged through the exhaust valve 720. Due to this phenomenon, as the residual gas inside the cylinder 500 is reduced, the internal pressure of the cylinder 500 is lowered, and more new air is introduced through the intake valve 710, accordingly. That is, the volumetric efficiency of the cylinder 500 is improved. In addition, new air that is introduced into the intake valve 710 and immediately exits through exhaust valve 720 has an effect of lowering the overall temperature of the exhaust gas. That is, the temperature of the exhaust gas discharged from the engine can be reduced.

With this configuration, the valve control apparatus 101 for the engine according to an embodiment of the present disclosure can improve engine torque, improve fuel economy of the engine, lower the temperature of engine exhaust gas, and reduce nitrogen oxide emissions, by increasing the volumetric efficiency of the cylinder 500.

In particular, it is possible to reduce nitrogen oxide emissions without installing complex equipment to apply an exhaust gas recirculation (EGR) system and a selective catalytic reduction system to the engine.

However, when the intake valve 710 is opened during the exhaust stroke, the internal pressure of the cylinder 500 and the pressure on the exhaust valve 720 side have to be higher than the pressure on the intake valve 710 side, and the pressure varies according to the operating conditions of the engine, and thus the opening/closing timing and period of the intake valve 710 has to be determined in consideration of both when the engine is operating in the low speed region and when the engine is operating in the high speed region.

In addition, when the exhaust valve 720 is opened during the intake stroke, the opening and closing timing and period of the exhaust valve 720 have to be determined in consideration of the variation in pressure depending on the rotational speed of the engine and the volumetric efficiency of the cylinder 500.

That is, opening the intake valve 710 during the exhaust stroke and opening the exhaust valve 720 during the intake stroke are distinctly different technologies and have different purposes, and thus the simple combination of the two technologies cannot be easily applied.

When opening the intake valve 710 during the exhaust stroke and opening the exhaust valve 720 during the intake stroke are simultaneously applied, the performance of the engine may be rather degraded. For example, when the engine is operating in a low speed region, the amount of air filled in the cylinder 500 is rather reduced, and the torque of the engine may be reduced, accordingly.

Therefore, the valve control apparatus 101 for the engine according to an embodiment of the present disclosure is made to an optimum value in consideration of all the above-described matters.

Figure 9:
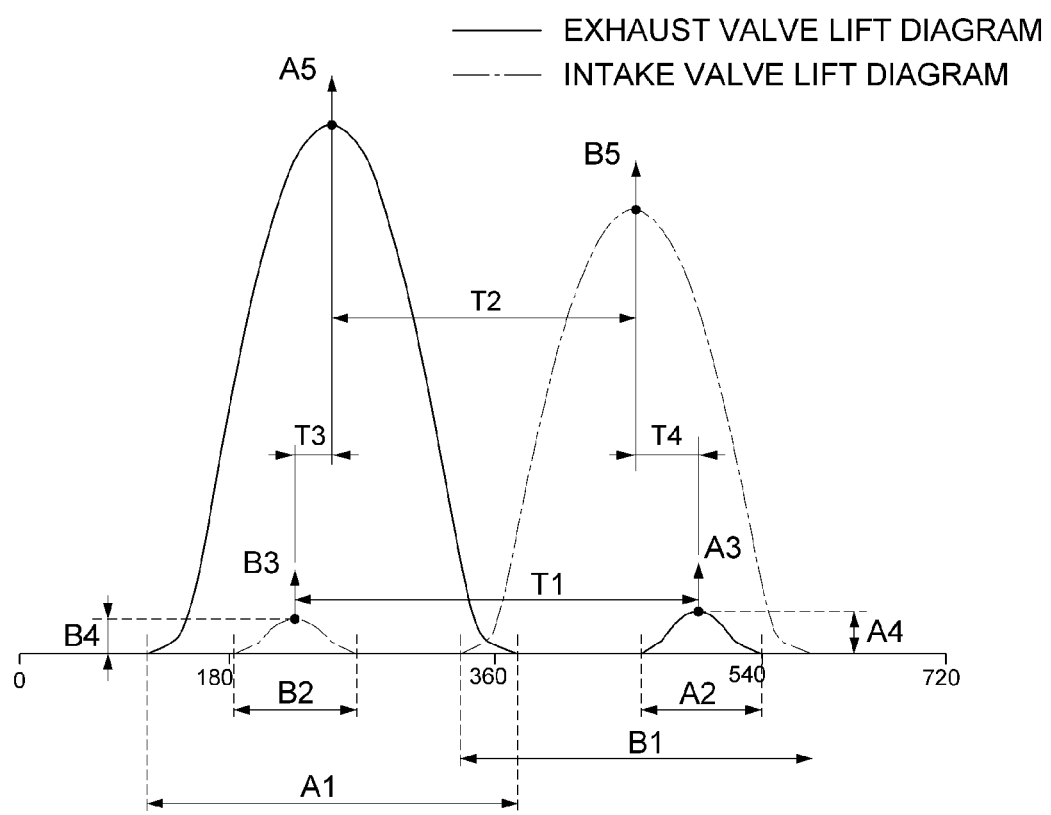
FIG. 9 is a view illustrating a numerical limitation of the profile of the valve control apparatus for the engine of FIG. 1.

Hereinafter, profiles of the intake cam 200 and the exhaust cam 300 included in the valve control apparatus 101 for the engine according to an embodiment of the present disclosure will be described with reference to lift diagrams shown in FIG. 9.

First, the piston 400 reciprocating within the cylinder 500 of the engine to which the valve control apparatus 101 for the engine according to an embodiment of the present disclosure may be located at a top dead center when a crankshaft rotation angle is 0 degrees, 360 degrees, and 720 degrees, and is located at a bottom dead center when the crankshaft rotation angle is 180 degrees and 540 degrees.

A first exhaust valve opening period A1 may fall within a range of 120 degrees to 390 degrees based on the crankshaft rotation angle. As an example, the first exhaust valve opening period A1 may range from 140 degrees to 375 degrees based on the crankshaft rotation angle.

A second exhaust valve opening period A2 falls within a first intake valve opening period B1, but a maximum opening point A3 of the exhaust valve 720 in the second exhaust valve opening period A2 may fall within the range of 487 degrees to 507 degrees based on the crankshaft rotation angle. That is, the exhaust valve 720 can be opened to the maximum later than the piston bottom dead center in the first intake valve opening period B1. In addition, A profile of the exhaust cam 300 may be formed so that a ratio of the second exhaust valve opening period A2 by the second exhaust cam nose 320 of the exhaust cam 300 to the first exhaust valve opening period A1 by the first exhaust cam nose 310 of the exhaust cam 300 is falls within a range of 0.32 to 0.36.

The first intake valve opening period B1 may fall within a range of 310 degrees to 590 degrees based on the crankshaft rotation angle. As an example, the first intake valve opening period B1 may range from 330 degrees to 580 degrees.

A second intake valve opening period B2 falls within the first exhaust valve opening period A1, but a maximum opening point B3 of the intake valve 710 in the second intake valve opening period B2 may fall within the range of 216 degrees to 236 degrees based on the crankshaft rotation angle. That is, the intake valve 710 can be opened to the maximum later than the piston bottom dead center in the first exhaust valve opening period A1. In addition, a profile of the intake cam 200 may be formed so that a ratio of the second intake valve opening period B2 by the second intake cam nose 220 of the intake cam 200 to the first intake valve opening period B1 by the first intake cam nose 210 of the intake cam 200 is falls within a range of 0.34 to 0.38.

In addition, profiles of the exhaust cam 300 and the intake cam 400 may be formed so that a maximum lift A4 of the exhaust valve 720 in the second exhaust valve opening period A2 and a maximum lift B4 of the intake valve 710 in the second intake valve opening period B2 is 0.8 mm or more.

In addition, the maximum lift A4 of the exhaust valve 730 in the second exhaust valve opening period A2 may be set to 10% or less of the maximum lift B5 of the intake valve 710, and the maximum lift B4 of the intake valve 710 in the second intake valve opening period B2 may be set to 10% or less of the maximum lift A5 of the exhaust valve 720. Meanwhile, the maximum lift A4 of the exhaust valve 720 in the second exhaust valve opening period A2 may be formed to be relatively large compared to the maximum lift B4 of the intake valve 710 in the second intake valve opening period B2. Meanwhile, the maximum lift A4 of the exhaust valve 720 in the second exhaust valve opening period A2 may be formed to be relatively large within a range of 15% to 25%, compared to the maximum lift B4 of the intake valve 710 in the second intake valve opening period B2.

In addition, the maximum lift time A3 of the exhaust valve 720 in the second exhaust valve opening period A2 and the maximum lift time B3 of the intake valve 710 in the second intake valve opening period B2 may be formed to have a first phase difference T1 of 260 degrees to 280 degrees based on the crankshaft rotation angle. The maximum lift point of the exhaust valve 720 in the first exhaust valve opening period A1 and the maximum lift point of the intake valve 710 in the first intake valve opening period B1 may be formed to have a second phase difference T2 of 190 degrees to 210 degrees based on the crankshaft rotation angle, and thus the first phase difference T1 may be formed to be larger than the second phase difference T2 by 30% or more. In addition, a fourth phase difference T4 between the maximum lift point A3 of the exhaust valve 720 and the maximum lift point of the intake valve 710 in the first intake valve opening period B1 may be formed larger than a third phase difference T3 between the maximum lift point B3 of the intake valve 710 and the maximum lift point of the exhaust valve 720 in the first exhaust valve opening period A1. As an example, the third phase difference T3 may be formed from 20 degrees to 28 degrees, and the fourth phase difference T4 may be formed from 38 degrees to 48 degrees.

With the phase differences described above, it is possible to not only help improve the volumetric efficiency of the cylinder and purify exhaust gas, but also prevent machining defects and durability degradation due to interference between the first intake cam nose 210, the second intake cam nose 220, the first exhaust cam nose 310, and the second exhaust cam nose 320 when the camshaft 100 of the valve control apparatus 101 for the engine is machined.

Hereinafter, with reference to FIGS. 10 to 13, experiment results of an engine to which the valve control apparatus 101 for the engine according to an embodiment of the present disclosure, which is manufactured with the above-described numerical values, is applied will be described.

Experimental results were divided into when the engine is operating in the low speed region and when the engine is operating in the high speed region, and again, the intake valve 710 and the exhaust valve 720 are separately displayed. Here, the low speed region and the high speed region may be variously changed depending on the type and performance of the engine. In the present experiment, the low speed region was 800 rpm, and the high speed region was 1800 rpm.

Figure 10:
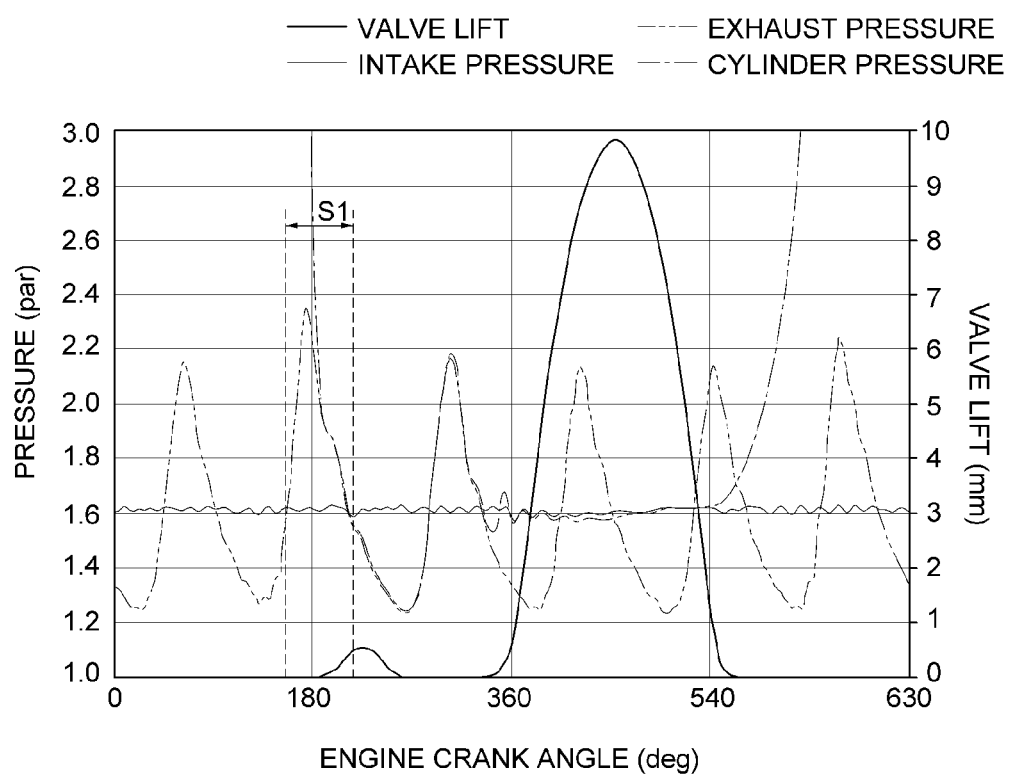
FIG. 10 is a graph showing an experiment result according to an operation of the intake valve when the engine to which the valve control apparatus for the engine of FIG. 1 is applied is operating in a low speed region.
Figure 11:
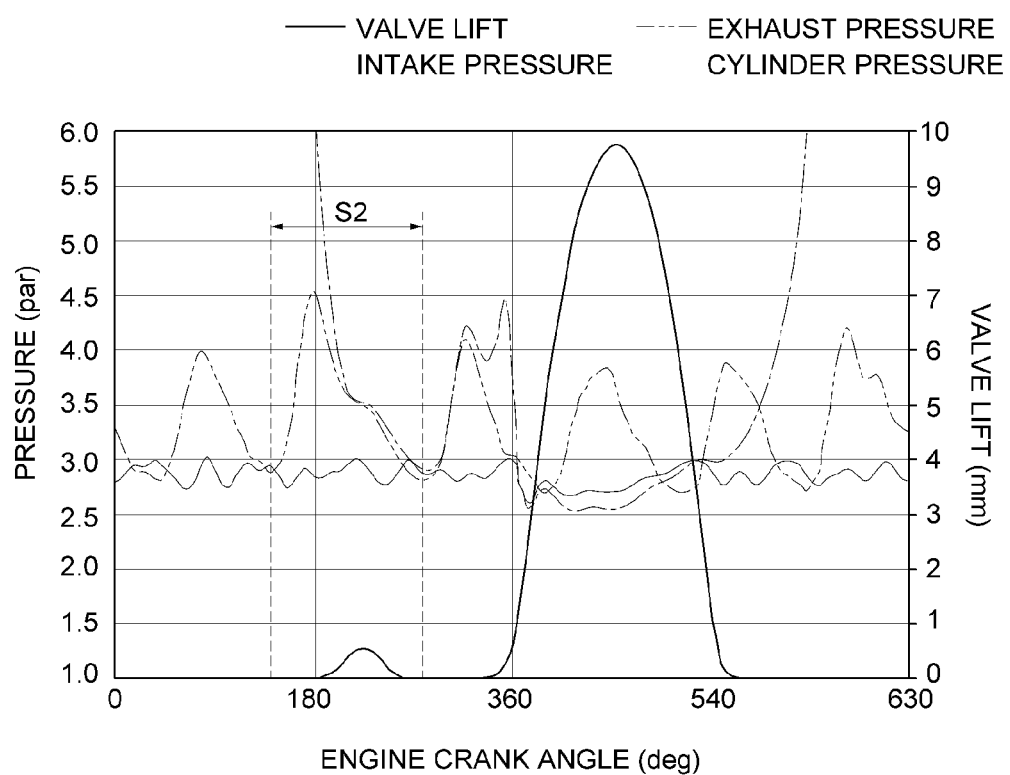
FIG. 11 is a graph showing an experiment result according to an operation of the intake valve when the engine to which the valve control apparatus for the engine of FIG. 1 is applied is operating in a high speed region.

Specifically, FIG. 10 is a graph showing the experimental results by the operation of the intake valve 710 when the engine is operating in the low speed region, and FIG. 11 a graph showing the experimental results by the operation of the intake valve 710 when the engine is operating in the high speed region. That is, FIG. 10 shows a change in internal pressure of the cylinder 500, a change in intake pressure, a change in exhaust pressure, and the degree of opening of the intake valve 710, when the engine to which the valve control apparatus 101 for the engine according to an embodiment of the present disclosure is applied is operating in the low speed region, and FIG. 11 shows a change in internal pressure of the cylinder 500, a change in intake pressure, a change in exhaust pressure, the degree of opening of the intake valve 710 when the engine to which the valve control apparatus 101 for the engine according to an embodiment of the present disclosure is applied is operating in the high speed region.

The timing of opening of the intake valve 710 during the exhaust stroke is to be set in a section where the internal pressure of the cylinder 500 and the pressure on the exhaust valve 720 side are higher than the pressure on the intake valve 710 side.

Here, the pattern in which the internal pressure of the cylinder 500 fluctuates is different in the high speed region and the low speed region depending on the operating conditions of the engine. In addition, both patterns of fluctuations in the intake pressure and the exhaust pressure may be different.

Therefore, the second intake valve opening period B2 is always to be set in a section in which the internal pressure of the cylinder 500 and the pressure on the exhaust valve 720 side are higher than the pressure on the intake valve 710 side, even if the operating condition of the engine changes. That is, the section in which the intake valve 710 is opened during the exhaust stroke is to be determined in consideration of section S1 in FIG. 10 and section S2 in FIG. 11.

In conclusion, it can be seen as the optimal condition through FIGS. 10 and 11 that the maximum opening point B3 of the intake valve 710 in the second intake valve opening period B2 falls within the range of 216 degrees to 236 degrees based on the crankshaft rotation angle.

Figure 12:
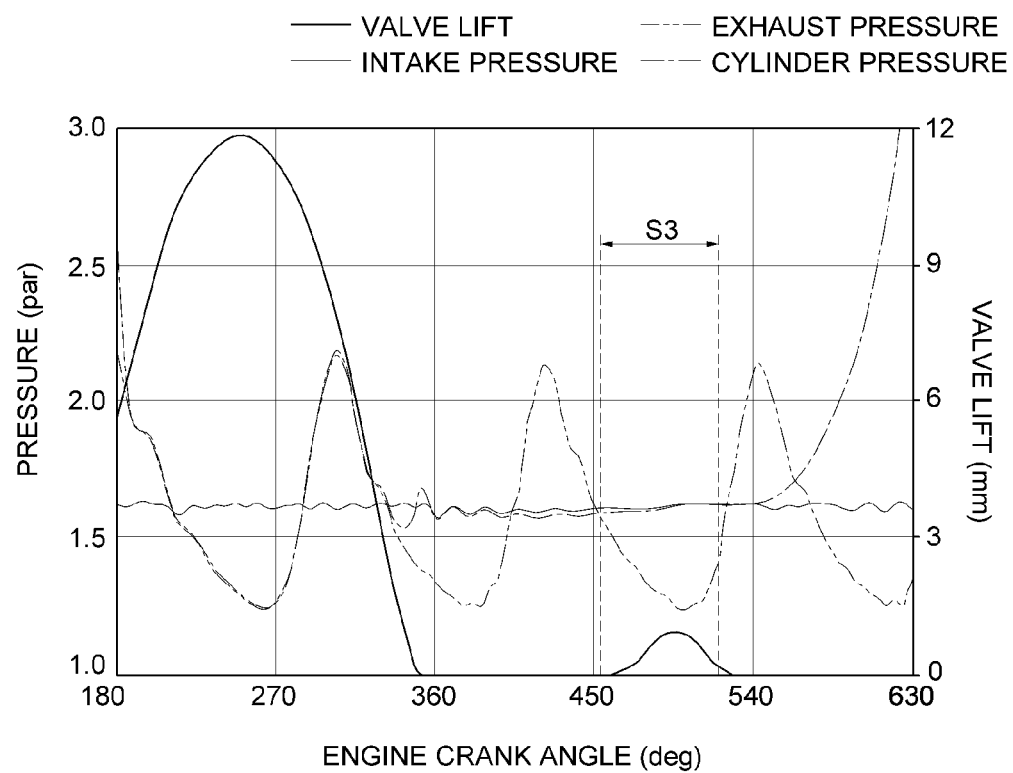
FIG. 12 is a graph showing an experiment result according to an operation of the exhaust valve when the engine to which the valve control apparatus for the engine of FIG. 1 is applied is operating in a low speed region.
Figure 13:
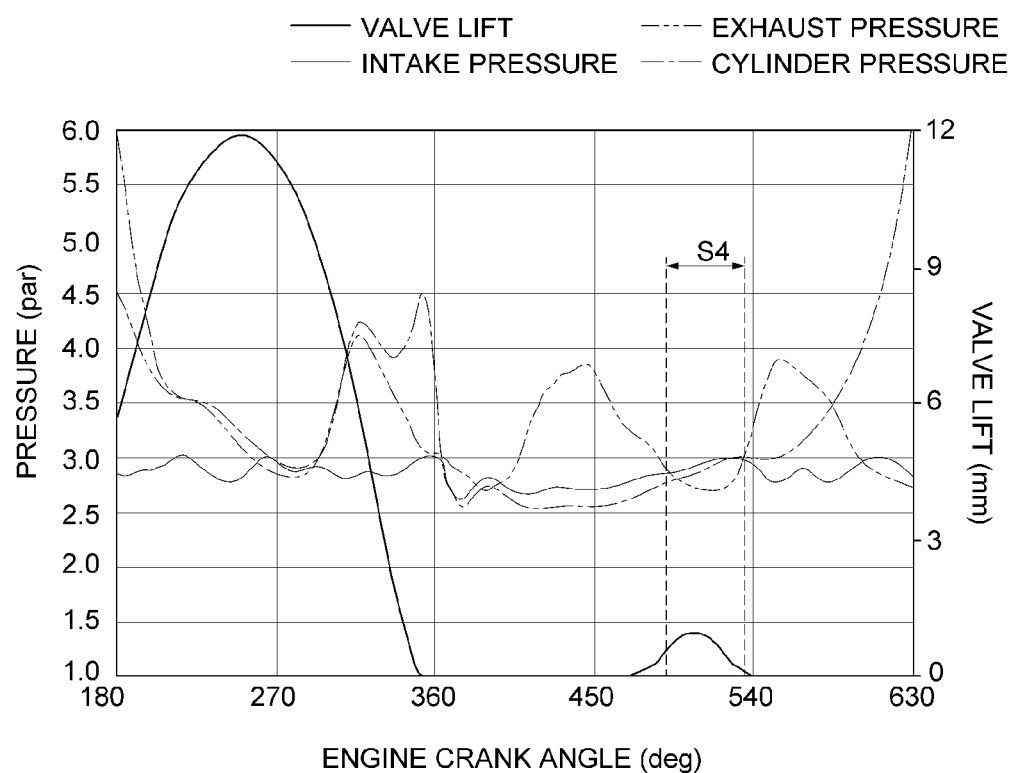
FIG. 13 is a graph showing an experiment result according to an operation of the exhaust valve when the engine to which the valve control apparatus for the engine of FIG. 1 is applied is operating in a high speed region.

In addition, FIG. 12 is a graph showing the experimental results by the operation of the exhaust valve 720 when the engine is operating in the low speed region, and FIG. 13 a graph showing the experimental results by the operation of the exhaust valve 720 when the engine is operating in the high speed region. That is, FIG. 12 shows a change in internal pressure of the cylinder 500, a change in intake pressure, a change in exhaust pressure, and the degree of opening of the lifted exhaust valve 720, when the engine to which the valve control apparatus 101 for the engine according to an embodiment of the present disclosure is applied is operating in the low speed region, and FIG. 11 shows a change in internal pressure of the cylinder 500, a change in intake pressure, a change in exhaust pressure, the degree of opening of the lifted exhaust valve 720 when the engine to which the valve control apparatus 101 for the engine according to an embodiment of the present disclosure is applied is operating in the high speed region.

Due to the characteristics of the engine, the change in the exhaust pressure is relatively large compared to the intake pressure. Therefore, there is a section in which the exhaust pressure is temporarily smaller than the intake pressure and the internal pressure of the cylinder by the fluctuation of the exhaust pressure. That is, the timing of opening the exhaust valve 720 during the intake stroke is to be determined at a point where the internal pressure of the cylinder 500 and the pressure on the intake valve 710 side are higher than the pressure on the exhaust valve 720 side. In this way, some of the new air introduced through the intake valve 710 may be discharged out of the cylinder 500 directly through the exhaust valve 720 due to the pressure difference.

Here, the pattern in which the internal pressure of the cylinder 500 fluctuates is different in the high speed region and the low speed region depending on the operating conditions of the engine. In addition, both patterns of fluctuations in the intake pressure and the exhaust pressure may be different.

Therefore, the second exhaust valve opening period A2 is always to be determined at a point where the internal pressure of the cylinder 500 and the pressure on the intake valve 710 side are higher than the pressure on the exhaust valve 720 side, even if the operating condition of the engine changes. That is, the section in which the exhaust valve 720 is opened during the intake stroke is to be determined in consideration of section S3 in FIG. 12 and section S4 in FIG. 13.

In conclusion, it can be seen as the optimal condition through FIGS. 12 and 13 that the maximum opening point A3 of the exhaust valve 720 in the second intake valve opening period A2 falls within the range of 487 degrees to 507 degrees based on the crankshaft rotation angle.

In addition, through the experiment, it was seen that an effect is exhibited when the maximum lift A4 of the exhaust valve 720 in the second exhaust valve opening period A2 and the maximum lift B4 of the intake valve 710 in the second intake valve opening period B2 is 0.8 mm or more. That is, it could be seen that a significant effect is exhibited that can improve engine torque, improve fuel economy of the engine, lower the temperature of engine exhaust gas, and reduce nitrogen oxide emissions, by increasing the volumetric efficiency of the cylinder 500 by lifting the intake valve 710 and the exhaust valve 720 at least 0.8 mm or more to open them.

Although the embodiments of the present disclosure have been described above with reference to the accompanying drawings, it should be understood that those skilled in the art to which the present disclosure pertains can carry out other modifications without changing the technical spirit or essential features thereof.

Therefore, the embodiments described above are merely exemplary in all respects and should not be construed to be limited, and it should be understood that the scope of the present disclosure is defined by the following claims and the meanings and ranges of the claims and all modifications and changed forms derived from their equivalents fall within the scope of the present disclosure.

INDUSTRIAL AVAILABILITY

According to embodiments of the present disclosure, a valve control apparatus for an engine may be used to improve engine torque, improve fuel economy of the engine, lower the temperature of engine exhaust gas, and reduce nitrogen oxide emissions, by increasing the volumetric efficiency of an engine cylinder.

What is claimed is:

1. A valve control apparatus for an engine that opens and closes an exhaust valve and an intake valve of the engine in conjunction with a crankshaft of the engine, the valve control apparatus comprising:
   an exhaust valve opening and closing device opening and closing the exhaust valve during a first exhaust valve opening period; and
   an intake valve opening and closing device opening and closing the intake valve during a first intake valve opening period,
   wherein
   the exhaust valve opening and closing device further opens and closes the exhaust valve during a second exhaust valve opening period relatively shorter than the first exhaust valve opening period within the first intake valve opening period,
   the intake valve opening and closing device further opens and closes the intake valve during a second intake valve opening period relatively shorter than the first intake valve opening period within the first exhaust valve opening period,
   a piston reciprocating within a cylinder of the engine is located at a top dead center when a crankshaft rotation angle is 0 degrees, 360 degrees, and 720 degrees, and is located at a bottom dead center when the crankshaft rotation angle is 180 degrees and 540 degrees,
   a maximum opening point of the exhaust valve in the second exhaust valve opening period falls within a range of 487 degrees to 507 degrees based on the crankshaft rotation angle,
   the first intake valve opening period falls within a range of 310 degrees to 590 degrees based on the crankshaft rotation angle,
   a maximum opening point of the intake valve in the second intake valve opening period falls within a range of 216 degrees to 236 degrees based on the crankshaft rotation angle, and
   the first exhaust valve opening period falls within a range of 120 degrees to 390 degrees based on the crankshaft rotation angle.

2. The valve control apparatus of claim 1, further comprising a camshaft connected to the crankshaft and driven to rotate,
   wherein the exhaust valve opening and closing device includes an exhaust cam provided on the camshaft,
   the intake valve opening and closing device includes an intake cam provided on the camshaft,
   the exhaust cam includes a first exhaust cam nose for opening and closing the exhaust valve during the first exhaust valve opening period and a second exhaust cam nose for opening and closing the exhaust valve during the second exhaust valve opening period,
   the intake cam includes a first intake cam nose for opening and closing the intake valve during the first intake valve opening period and a second intake cam nose for opening and closing the intake valve during the second intake valve opening period, and
   the second exhaust cam nose and the second intake cam nose are formed to have a size relatively smaller than the first exhaust cam nose and the first intake cam nose, respectively.

3. The valve control apparatus of claim 2, wherein a profile of the exhaust cam is formed so that a ratio of the second exhaust valve opening period by the second exhaust cam nose of the exhaust cam to the first exhaust valve opening period by the first exhaust cam nose of the exhaust cam is falls within a range of 0.32 to 0.36.

4. The valve control apparatus of claim 2, wherein a profile of the exhaust cam is formed so that a ratio of the second intake valve opening period by the second intake cam nose of the intake cam to the first intake valve opening period by the first intake cam nose of the intake cam falls within a range of 0.34 to 0.38.

5. The valve control apparatus of claim 2, wherein a maximum lift of the exhaust valve in the second exhaust valve opening period and a maximum lift of the intake valve in the second intake valve opening period are 0.8 mm or more.

6. The valve control apparatus of claim 1, wherein a maximum lift of the exhaust valve in the second exhaust valve opening period and a maximum lift of the intake valve in the second intake valve opening period are 0.8 mm or more.

* * * * *